Jan. 3, 1967  S. W. WORTHINGTON  3,295,881
CARGO CARRIER FOR LOAD-HANDLING SYSTEMS
Filed July 31, 1964  6 Sheets-Sheet 1
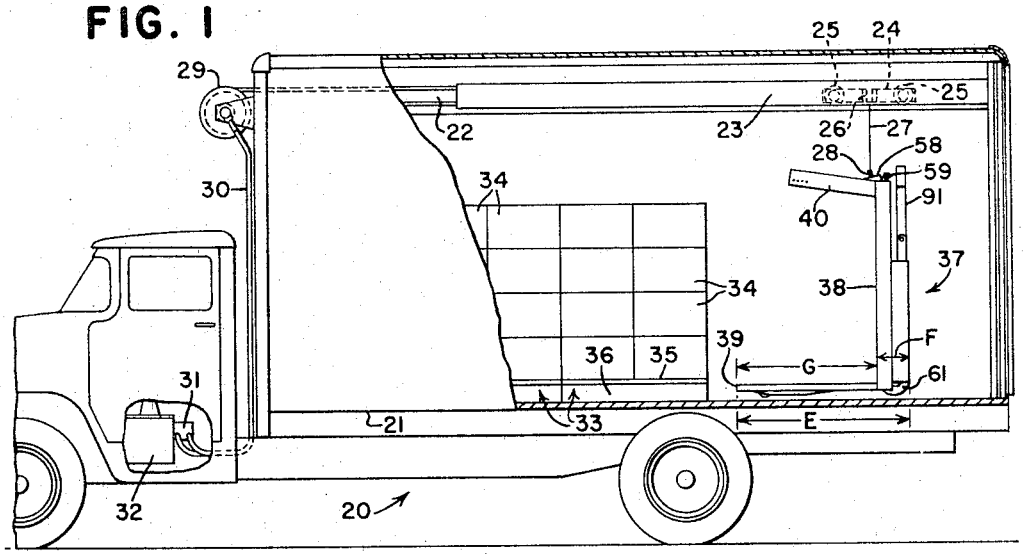
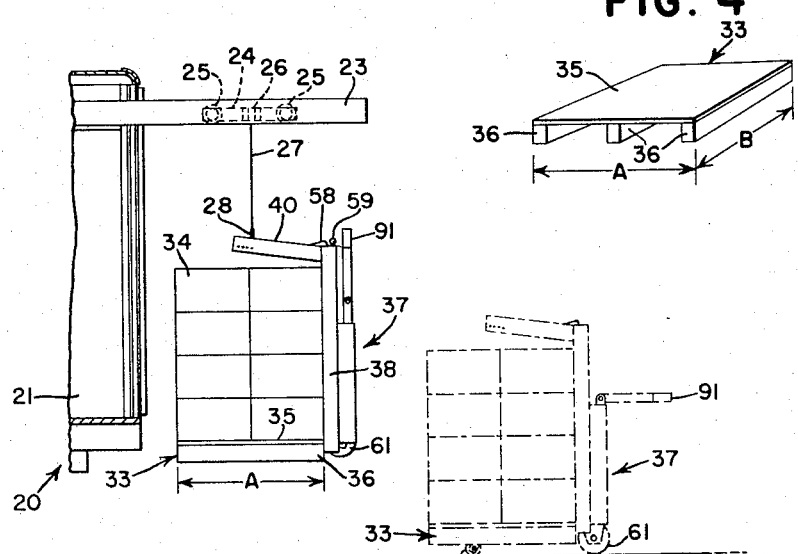
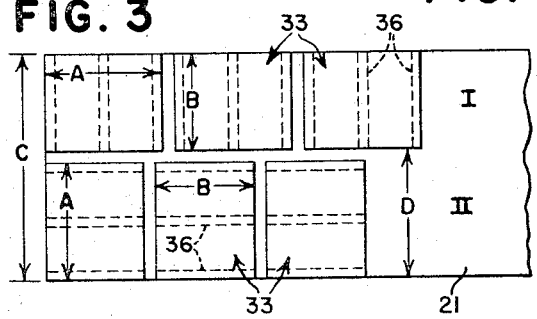
INVENTOR.
S. W. WORTHINGTON
BY
ATTORNEY Jan. 3, 1967 S. W. WORTHINGTON 3,295,881
CARGO CARRIER FOR LOAD-HANDLING SYSTEMS
Filed July 31, 1964 6 Sheets-Sheet 2
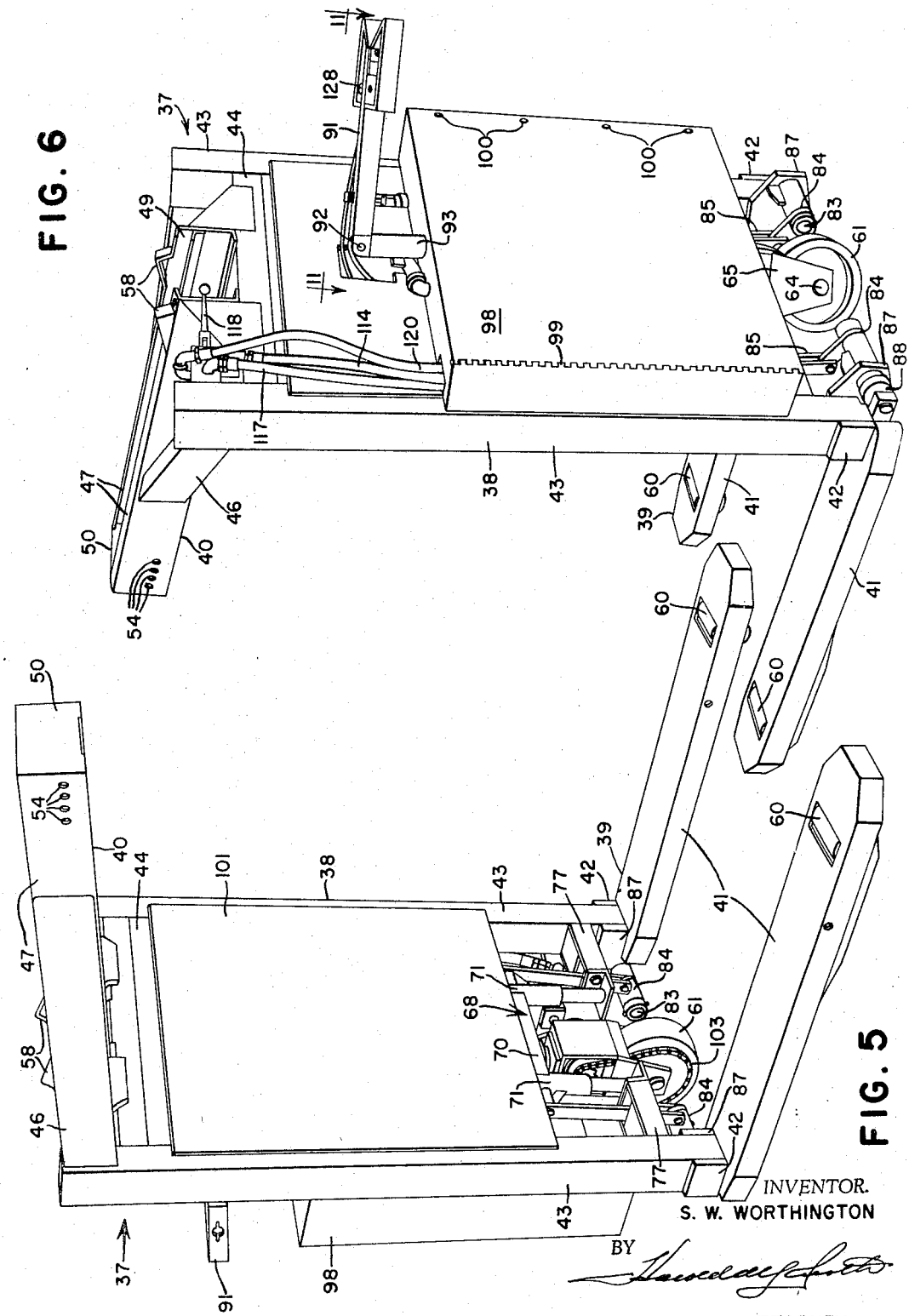
INVENTOR.
S. W. WORTHINGTON
BY 
ATTORNEY

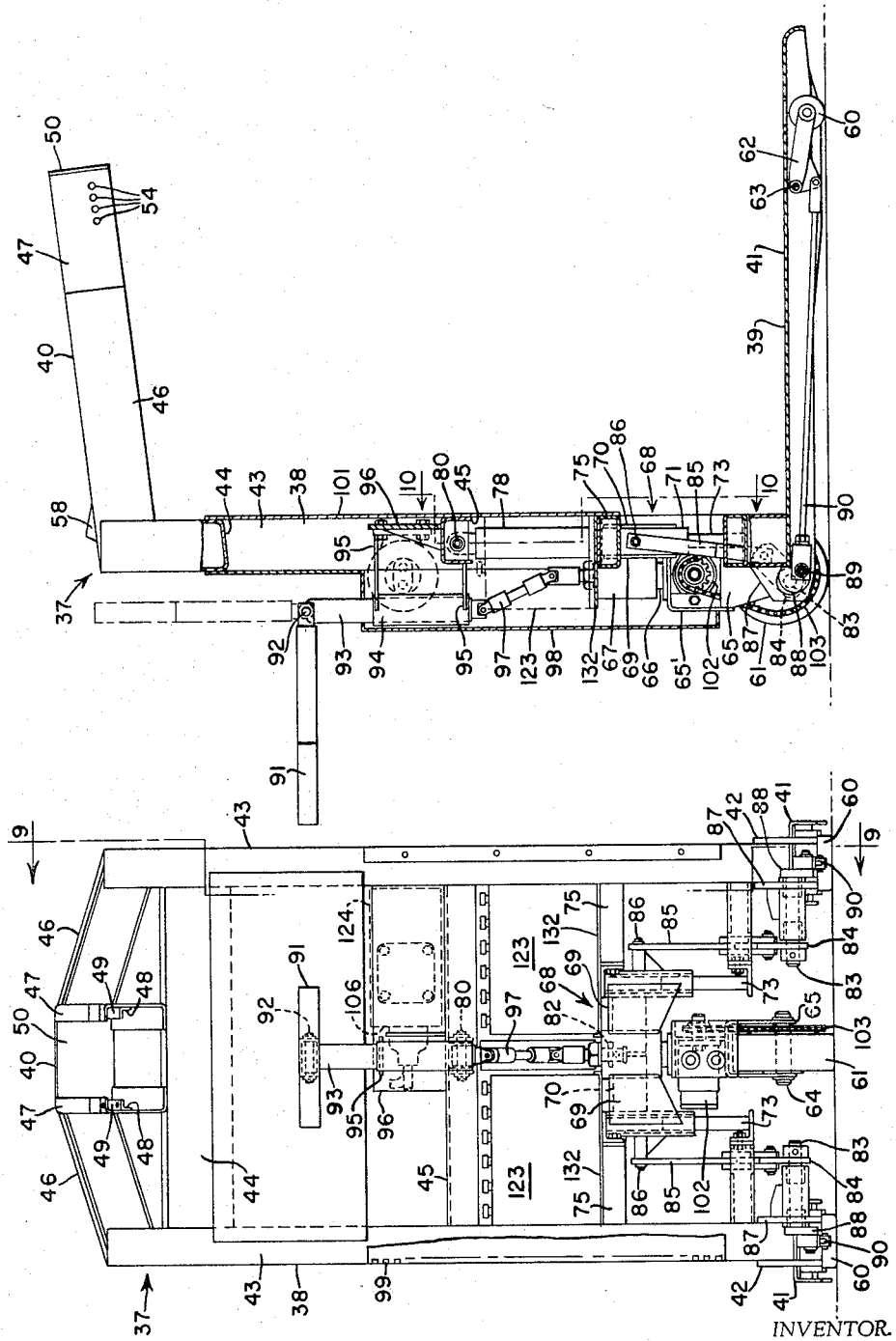

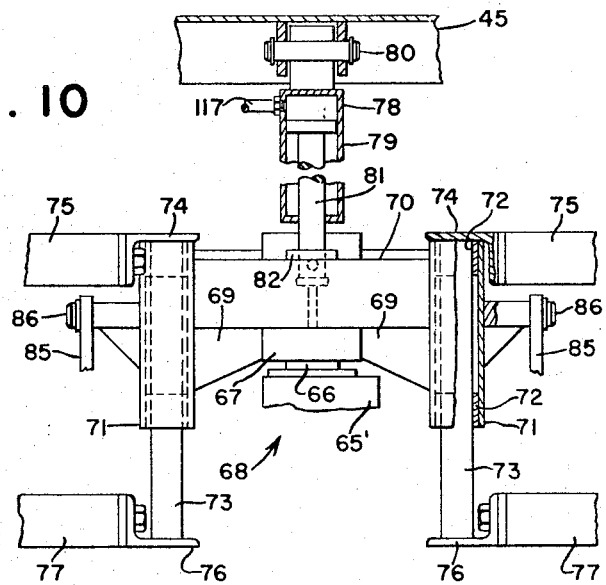

Jan. 3, 1967 S. W. WORTHINGTON 3,295,881
CARGO CARRIER FOR LOAD-HANDLING SYSTEMS
Filed July 31, 1964 6 Sheets-Sheet 6
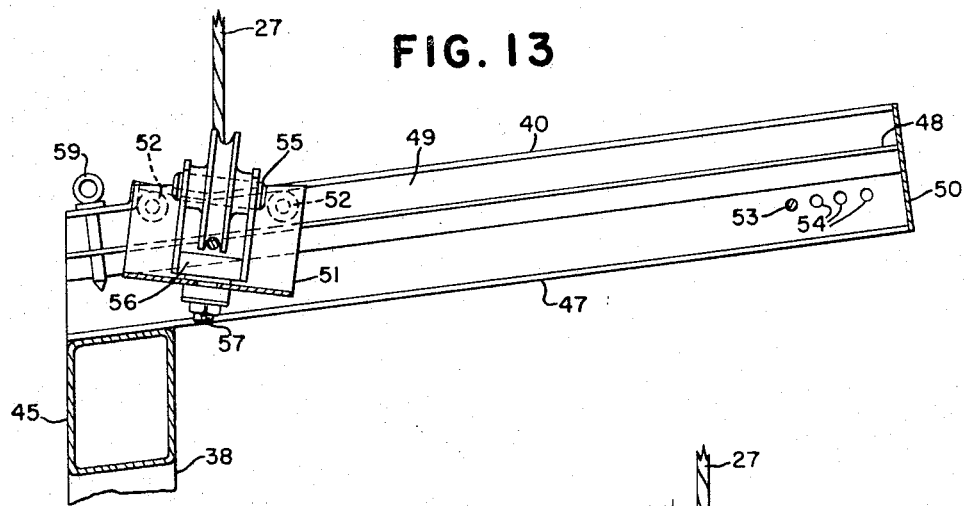
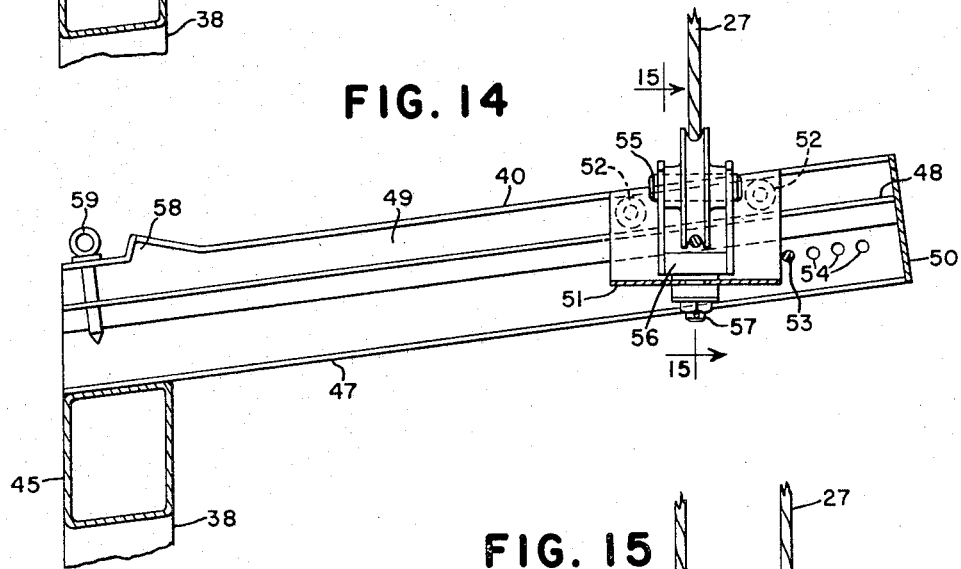
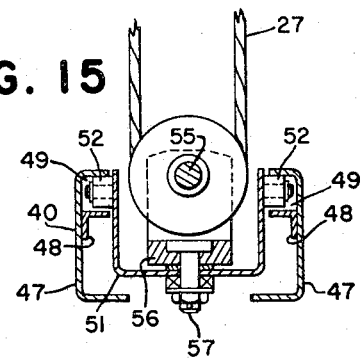
INVENTOR.
S. W. WORTHINGTON
BY
ATTORNEY

United States Patent Office 3,295,881
Patented Jan. 3, 1967

3,295,881
CARGO CARRIER FOR LOAD-HANDLING
SYSTEMS
Stanley W. Worthington, 720 Prospect Blvd.,
Waterloo, Iowa 50701
Filed July 31, 1964, Ser. No. 386,722
8 Claims. (Cl. 294—67)

This invention relates to a load-handling system and more particularly to a mobile, portable cargo carrier usable in loading and unloading transport vehicles and the like wherein economy, efficiency and maneuverability are of prime importance.

The art of handling containers, or goods and materials packed in containers such as boxes, crates, cartons, barrels, etc., has developed largely along the lines of palletized groups capable of being handled, moved, stacked, loaded and unloaded by mechanized or semi-mechanized units such as fork lift trucks, pallet forks, conveyors and the like. Another important consideration is the size or cargo-carrying area of the vehicle, such as a motor truck or van, to be loaded and unloaded, since state laws restrict vehicle sizes as to length, width and height. Therefore, the art has attempted to correlate cargo-carrying capacity of such vehicles with palleted stacks or groups of containers so that maximum pay load is achieved. To further augment efficiency and to reduce manual labor to a minimum, the vehicle itself may be equipped with load-handling means of its own, such as a crane, overhead tracks, floor rollers, etc.

It has been found, however, that despite the foregoing improvements, current lift trucks and similar power units are too cumbersome and unwieldy to be used within a van, for example, or similar vehicle where space is at a premium. Also, such units are too large and heavy to be conveniently handled by overhead track systems. Although slings, simple forks, etc., can be handled by such systems they lack self-contained mobility, are not powered and must be re-handled by loading on or unloading from secondary vehicles such as lift trucks in any event.

The principal object of the present invention is therefore to provide a novel, light-weight powered unit, or cargo carrier, combining mobility and maneuverability and capable of being used efficiently in close quarters. It is an important object of the invention to provide such unit with its own power means and to use such power means for propelling the unit. It is a further important object to utilize on the unit extensible and retractible wheel means to enable the fork or load-carrying part of the unit to be lowered for insertion beneath a load or loaded pallet while the wheel means are retracted and to pick up the load when the wheel means are extended. In this respect it is a further object to utilize the power means for extending and retracting the wheels.

It is another important object of the invention to incorporate and dispose the basic mechanism for powering the unit and for operating its components within an extremely limited space so as to reduce the overall size of the carrier to such that it can be easily maneuvered inside a van, for example, as well as being relatively light so that it can be handled by overhead track systems or the like. In this area of the invention, the carrier has fork means insertable beneath a palleted load and upright structure at the rear of the fork means and affording a compartment or compartment-like means or space capable of containing or housing the power means, drive and control means, etc., said structure being however of such limited fore-and-aft dimension that the overall fore-and-aft length of the carrier is kept to a minimum, preferably on the order of half the width of the interior transverse dimension of the cargo-carrying space of a typical motor truck, van, etc.

A further object of the invention resides not only in making the unit self-propelled but also giving it steerability. Still further, it is an object of the invention to provide the carrier with means whereby it may be suspended from overhead structure such as a track and, in addition, to provide such means with selectivity as to position so that the carrier may be suspended at its respective centers of gravity when loaded or empty.

The invention has for a further object improved power means including a fluid-pressure or hydraulic system having motors for driving or tractionizing the wheel means and for extending and retracting the wheel means, control valves for the motors including means for varying the speed and direction of the wheel means and control means for steering the wheel means. A still further object is to combine on said steering control means parts of the controls for starting, stopping, reversing and varying the speed of travel of the carrier.

The foregoing and other important objects and desirable features inherent in and encompassed by the invention will become apparent to those versed in the art as a preferred embodiment of the invention is disclosed in detail, by way of example, in the ensuing description and accompanying sheets of drawings wherein:

FIG. 1 is a fragmentary side elevation, with portions broken away and other parts shown in section, of a representative cargo-carrying vehicle with which the inventive carrier or unit may be employed;

FIG. 2 is a fragmentary view of the rear portion of the vehicle of FIG. 1, showing in full and broken lines two different conditions of the cargo carrier in use;

FIG. 3 is a schematic plan view, on a reduced scale, of a portion of the floor or cargo-carrying area of the vehicle of FIG. 1;

FIG. 4 is a perspective, on a somewhat enlarged scale, of a typical load-carrying pallet;

FIG. 5 is an enlarged perspective of the unit or carrier as seen from the front and one side;

FIG. 6 is a perspective, on a smaller scale than FIG. 5, showing the unit as seen from the rear and the opposite side;

FIG. 8 is a rear elevation, on a reduced scale and with much of the power means and rear cover omitted, and showing the structural aspects of the framework, wheel means and related parts;

FIG. 9 is a side elevation, in large part, of FIG. 8, but shown partly in section as seen along the line 9—9 of FIG. 3;

FIG. 10 is an enlarged fragmentary section as seen generally along the line 10—10 of FIG. 9;

FIG. 11 is an enlarged fragmentary plan of the control handle as seen along the line 11—11 of FIG. 6;

FIG. 12 is a schematic diagram of the hydraulic system;

FIG. 13 is an enlarged view, partly in section, showing the upper arm or track means of the carrier, with the suspension means or trolley in the position it occupies when the carrier is empty;

FIG. 14 is a similar view but showing the trolley in one of the positions it occupies when the carrier is loaded; and FIG. 15 is a section on the line 15—15 of FIG. 14.

Figure 7:
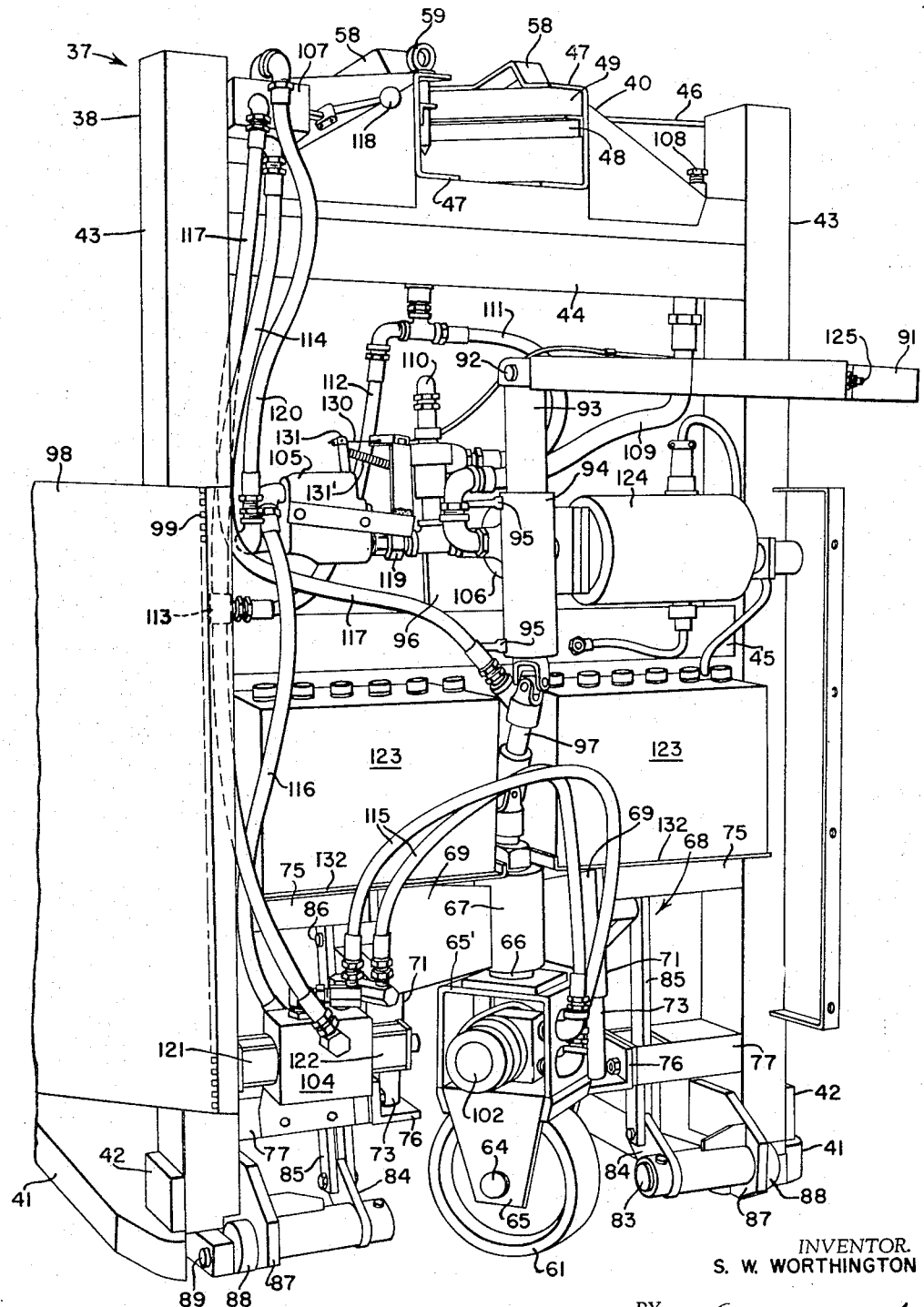
FIG. 7 is an enlarged rear perspective of the unit as seen with its rear cover open so as to expose the power means and its allied components.

Reference will be had first to FIGS. 1-6 for an environmental picture of the invention and its utility. The numeral 20 designates a motor truck of conventional type having a rear body in the form of a van 21; although, this in its entirety is but representative, since the invention may be used with other transport media within as well as outside of the motor vehicle area. Within the four walls, floor and roof of the van is the cargo-carrying space, and the dimensions thereof define the cargo-carrying capacity of the van. FIG. 3 shows a typical transverse dimension or width C, here ninety-two inches. Since the length may vary according to whether the truck is a trailer, semi-trailer, etc., no specific dimension is shown here, especially since it is the dimension C that turns out to be relatively more critical.

The van is provided interiorly with an overhead load-handling system, here a fore-and-aft track means 22 along which an elongated boom means 23 is movable between a retracted position wholly within the van or body (FIG. 1) and various extended positions projecting rearwardly through the open rear of the van (FIG. 2). The boom means itself, as is well known, may be of a track-like nature to support a carriage 24, as by rollers 25, for movement lengthwise thereof. The carriage also has a cross track 26 therein so that any load suspended from the carriage is movable laterally as well as fore-and aft, within the van when the boom is retracted and outside the van when the boom is extended. Such load is typically suspended by a looped cable 27 which supports a sheave 28 (FIGS. 13–15) in its lower bight. As will be clear to those versed in the art, the cable 27 may be retracted and extended to raise and lower the sheave and the load carried thereby. This may be achieved by any suitable means not material here but a representative example which is shown in my copending application Ser. No. 241,719, filed Dec. 3, 1962, now Patent No. 3,154,025. Likewise, any suitable power means may be employed for extending and retracting the boom and for moving the carriage 24 along the boom, as in said copending application. In the present case, the numeral 29 designates a hydraulic winch energized, for example, by fluid lines 30 from a pump 31 driven by the vehicle transmission, as at 32. These are of course details that could be widely varied without affecting the invention.

FIG. 4 shows a typical pallet 33 such as is conventionally used for handling a plurality or group of smaller packages, containers, etc. as shown at 34. The pallet has a top board or plate 35, typically of wood or like material, supported by a plurality of parallel skids 36 which of course space the board above the ground or floor to allow for the insertion of the tines of a fork lift truck beneath the load via the spaces between the skids. By any means not material here, the several packages, boxes etc. are previously stacked on the pallet and it remains only to handle the loaded pallets rather than the large number of smaller packages. By a system of relative standardization, pallets of this type have come to have certain length and width dimensions such as A, which may be forty-eight inches. FIG. 3 shows that if one row of pallets, as at row I, is made up of pallets alined in the van 21 with dimenson B crosswise of the van, while the second row II is disposed with dimension A crosswise, the total width of the two rows will be eighty-eight inches, just under the ninety-two-inch width C of the van. It will also be clear that both rows could not have dimension A crosswise, for this would be ninety-six inches. Likewise, both rows with dimension B crosswise would be eighty inches, a waste of space. As shown, the cross-dimension AB of the two rows I and II leaves a four-inch margin or tolerance. More important, however, is the sequence in which the rows are formed, wherein pallets in row I are loaded first, leaving a remaining van space D of fifty-two inches. As will be brought out below, this system enables the use of the novel, specially designed cargo carrier, designated as a whole by the numeral 37 (FIGS. 1, 2, 5 and 6), the overall fore-and-aft length of which is such as to enable it to maneuver or be maneuvered in this relatively limited fifty-two-inch space.

This cargo-handling unit or carrier comprises a frame made up of several rigidly united steel members or elements of appropriate section and strength, the basic ones of which, as sub-units, include an upright structure or element 38, a lower, load-carrying element or fork means 39, and an upper element or arm 40.

The fork means is made up of a pair of tines 41, preferably of inverted channels, spaced apart laterally so as to be capable of entering the spaces between the skids 36 of the pallets. Each tine has of course a free front end and is rigidly secured at its rear end at 42 (FIGS. 5 and 6) to the lower end of an upright frame member 43 of the upright or rear structure 38. The two upright members are rigidly cross-connected by upper and intermediate cross members 44 and 45 and are further rigidly braced by braces 46 to the arm element 40, which includes a pair of parallel, inwardly facing channels 47 which are respectively supplemented at their inner faces by angle bars 48 to establish a pair of tracks 49 running lengthwise of the arm 40 (FIGS. 13–15). The free front end of the arm 40 is closed by a cross plate 50 welded across the ends of the channels 47.

The tracks 49 carry therein a trolley 51 which serves as means, along with the cable 27 and sheave 28, for suspending the carrier 37 from the overhead system of the truck 20. The trolley, best shown in FIGS. 13–15, is here in the form of a U-shaped member having rollers 52 at its opposite sides that ride in the tracks 49 to carry the trolley for selective positioning lengthwise in the arm 40 between the position of FIG. 13 and a plurality of other positions, such as in FIG. 14, wherein the trolley may be selectively stopped by a cross pin 53 insertable in paired holes 54 in the forward ends of the arm channels 47. In the event that the pin 53 is removed, lost, etc., the trolley cannot escape from the forward end of the arm 40, because it will be stopped by the plate 50. Since the arm or track means therein inclines uphill and forwardly, the trolley tends to run to the forward end of the arm when a lifting force is applied thereto by the cable 27 and sheave 28, the connection of which to the trolley is effected by a pin or sheave shaft 55 passed through the sheave and through apertured ears of a U-shaped swivel 56 connected to the trolley by a suitably journaled vertical pivot or swivel shaft 57 which enables the suspended carrier 37 to swing about a vertical axis without twisting the cable 27.

The two positions of FIGS. 13 and 14 are pre-selected on the basis of the locations of the respective centers of gravity of the carrier when empty and loaded, the plurality of holes 54 accommodating the pin 53 according to loaded conditions of different weights. In either case, the principle is to keep the suspended carrier—empty or loaded—in a level status; i.e., with its tines 41 level or substantially so. The location of the FIG. 13 position (carrier empty) is established by releasably locking the trolley 51 against movement uphill on the arm 40. For this purpose, each track 49 has notch recess means 58 in which one pair of transversely alined rollers 52 may engage. It will be seen that the upward pull on the cable 27 (FIG. 13) will tend to retain the roller-recess interlock. This may be easily manually released by the operator when the carrier 37 is loaded—with tension relaxed on the cable 27—whereupon the trolley can run uphill, stopped by the pin 53 in the selected pair of holes 54, determined according to the weight of the picked up palleted load.

The trolley 51 as a unit, still connected to the sheave 28 and thus to the cable 27, can be removed, when desired, from the open rear end of the tracked arm 40 by removal of a stop pin 59, as where the carrier is loaded remote from the truck or used apart from the truck.

From the description thus far, it will be seen that when the truck 20, situated for loading, for example, the carrier 37 is maneuvered, by means to appear below, into position to pick up a palleted load 33–34 by insertion of its tines beneath the pallet board 35 and between the pallet skids 36. The loaded carrier is brought into position (broken lines, FIG. 2) to receive the cable-suspended trolley 51, which is inserted at the rear end of the arm 40, following which the rear stop pin 59 may be inserted and the trolley manually guided past the recess means 58 and selectively stopped at 54. The cable 27 is retracted in and the loaded carrier lifted (full lines, FIG. 2) to the level of the floor of the van, then maneuvered to the front of the van to form row I, with dimension B of the pallet crosswise of the van. Since dimension B is forty inches, in the illustrated example, fifty-two inches is left at D in which to turn the carrier 90° from straight-ahead travel and in which to turn back up the carrier (to the left side of the van) when it sets the loaded pallet down on the van floor. Hence, the overall fore-and-aft length of the carrier (dimension E, FIG. 1) must be less than fifty-two inches, which has not heretofore been attained in a carrier of the type disclosed here.

This dimension E results from a recognition that a certain length is required for the tines 41—sufficient to properly carry the loaded pallet. In the present case, this length—dimension G— is thirty-eight inches. The fore-and-aft dimension of the upright structure 38 (F) must be small enough so that when added to the G the total (E) is not excessive. That is, it cannot exceed fifty-two inches (dimension D), and proper design, it has now been determined, dictates that E should be materially less than that. Accordingly to the present invention, dimension F has been brought down to well under one foot, actually, in a preferred embodiment, to eight and one-half inches. This added to G—tine length of thirty-eight inches— makes E—total fore-and-aft length of the carrier—a mere forty-six and one-half inches, easily sufficient to enable maneuvering the carrier within the fifty-two inch space (C minus B).

The problems of lateral withdrawal and turning are not presented in the formation of row II, since the carrier 37 may be simply backed out of each pallet as the pallet is set down on the van floor.

The characteristics and factors involved in limiting dimension F to the order of one-fifth—one sixth that of E will be discussed below, following the ensuing description of the mobility features of the carrier, which are required to enable the carrier, empty or loaded, to be moved, manually or by power, when free from the overhead system 23–28.

For this purpose, the carrier is equipped with front and rear wheel means, the former comprising two wheels 60, one at the front end of each tine 41, and the rear wheel means comprising a single, larger, steerable driven or traction wheel 61. These wheels are vertically extendible and retractible so as to raise and lower the carrier and thus to enable the tines 41 to pick up and set down the pallet. That is, when the wheels are extended (broken lines FIG. 2) the tines or fork means are elevated and the pallet skids are clear of the ground or floor. When the wheels are retracted, the fork means lowers, the pallet skids rest on the floor and the carrier can be backed away from the pallet, the tines being withdrawn from beneath the pallet. In each case, however, whether the wheels are extended or retracted, they always remain in contact with the ground or floor, and it is the carrier that raises and lowers.

Each front wheel 60 is mounted on a bell crank 62 pivoted at 63 to the associated tine 41 (FIG. 9). The steerable rear wheel 61 is journaled on an axle 64 in a yoke or fork 65 which has as a rigid part thereof an upper box 65' united to a vertical steering shaft 66 journaled in an upright bearing sleeve 67 forming part of slide and guide structure or means 68 (FIGS. 5 and 7–10) by which the carrier 37 is mounted for vertical movement relative to the wheel means. This structure includes a pair of steel plates 69 and a cross member 70 rigidly secured to the sleeve 67 and extending oppositely laterally therefrom and rigidly connected to a pair of upright guide tubes 71, in each of which is suitably slidably carried, as by bushings 72, a vertical guide rod or bar 73. The upper end of each rod is secured to a bracket 74 which is bolted to a stub support 75 which extends outwardly and is welded to the proximate member 43 of the upright structure 38. Each rod at its lower end is secured to a lower bracket 76 which is in turn secured to a lower stub support 77. Welding is the preferred securing method for joining the permanently connected parts but since this is a familiar practice, specific identification of welds is omitted. The structure made up of the parts 67, 69, 70 and 71 establish that component of the slide or guide means 68 that carries the rear wheel 61. The structure composed of the parts 73, 74, 75, 76 and 77 establish the cooperative component that supports the carrier, the two together serve as a lower cross brace means for the uprights 43 of the element 38, supplementing the cross members 44 and 45 described above.

Now, a vertical force acting downwardly on the wheel 61 and its mounting means 67, 69, 70 and 71 and reacting upwardly on the carrier via the means 73–77 will raise the carrier relative to the wheel 61. This force is applied here by force-exerting means in the form of a hydraulic ram or cylinder and piston assembly 78 having a cylinder 79 anchored at its upper end at 80 to the cross member 45 and a piston rod 81 connected at 82 to the plate means 69–70. Thus when the ram is extended, the member 45 rises and, being connected to the carrier, raises the carrier. Conversely when the cylinder retracts, the carrier descends. The ram is here shown as being of the one-way type, fluid-pressurized for extension and fluid-exhausted for retraction as will be described below.

In order to keep the carrier level during raising and lowering thereof, the front wheels 60 are linked to the power means, achieved here by providing on lower parts of the carrier a pair of rock shafts 83, one for each wheel 60. Fixed to the inner end of each rockshaft is an arm 84 linked at 85 to a pin 86 on the associated guide sleeve or tube 71. The rockshafts 83 are carried in plates 87 that form part of the connections 42 between the tines 41 and the uprights 43. Each rockshaft has an eccentric outer end 88 connected by a pin 89 to a link 90 which extends beneath and is enclosed by the respective tine 41 and is connected to the associated front wheel bell crank 62. As the carrier is elevated by the ram 78, it of course raises the rockshafts 83 and these in turn have the arms 84 connected by the links 85 to the sleeves 71 which remain stationary with the wheel 61. Hence, the links 85 resist upward movement of the free ends of the arms 84 and thereby impart clockwise rocking of the rockshafts 83 (as seen in FIG. 9), tensioning the links 90 and rocking the bell cranks 62 also clockwise, tending to force the wheels 60 down but reacting to raise the tines. The linkage is so designed that the tines are level in both raised and lowered positions.

As previously described, the rear wheel 61 is steerable about the vertical axis of the steering shaft 66 as journaled in and axially restrained by the sleeve or bearing 67, which is centrally between the uprights 43. Manual control of this wheel is afforded by a control handle 91, pivoted at 92 on a cross axis to the upper end of a vertical steering shaft 93 which is axially slidably and rotatably carried in a sleeve 94 that is rigidly secured as by steel webs 95 to a cross piece 96 which is in turn carried by the cross member 45. As best seen in FIGS. 7 and 9, the axes of the shafts 66 and 93 are in fore-and-aft alinement but are offset fore-and-aft and therefore a universally jointed shaft 97 is used to interconnect the two so that turning force applied to the shaft 93 is transmitted to the shaft 66 and thence via the yoke 65 to the wheel 61. This offset allows placing the wheel 61 substantially directly beneath the mass of the upright structure 38 while enabling rearward disposition of the shaft 93 for obtaining maximum swing of the handle 91 without unduly enlarging the dimension F, previously described. The handle 91 can be "folded" (broken lines, FIG. 9) to a storage position within the plane of a transverse upright rear cover 98, hinged at 99 at the left hand side of the structure 38 and removably secured as by screws 100 at the righthand side. This provides for ready access to the mechanism—to be further described—within the compartmentation or space provided by the upright structure as supplemented or as including the rear cover, the side members 43, the cross structure 44, 45, 68 and a front cover 101. The covers when in place serve a protective purpose as well as augmenting the appearance of the unit.

So far there has been described a novel carrier in the form of a mobile, liftable, steerable fork capable of picking up, transporting and setting down pallets. In its lifted status, it can be suspended from different positions corresponding respectively to different centers of gravity according to whether it is empty or loaded at varying weights. Its ability to pick up and set down palleted loads is enhanced by the power operated means including the ram 78, and the equalizing linkage between the ram and wheels 60 and 61 assures a level condition of the fork means or tines whether raised or lowered.

The overall fore-and-aft dimension E is such that the carrier can readily accommodate itself to limited space conditions as previously described, whether it is moving alone on the floor of the van or suspended by the overhead system 23–28.

In addition to the foregoing, the carrier has the further features that it is power propelled and the means for accomplishing this is designed to be contained wholly within the limits of the upright structure 38 which has the aforementioned relatively narrow fore-and-aft dimension F.

The wheel 61 is driven by a reversible variable-speed rotary hydraulic motor 102, which may be of any well known type. This motor is contained within the upper box part 65' of the rear wheel yoke 65 and its shaft is chain- and sprocket-connected at 103 to the wheel shaft or axle 64. The motor is pressurized, under control of a reversing valve 104 and speed control valve 105, by a hydraulic pump 106 which is part of a fluid-pressure system including the lift ram 78 and a lift control valve 107. The cross member 44 is tubular and serves as a fluid reservoir, fillable at 108 (FIG. 7) and connected to the inlet side of the pump by a fluid line 109. The reservoir is also connected to a relief valve 110, by a line 111, and, to one side of the lift valve 107, by a line 112 which has a T connection 113 to a line 114 which leads from the lift valve to one side of the reversing valve 104. The reversing valve is connected by lines 115 to the rotary wheel motor 102 and by a line 116 to the speed valve 105. A line 117 connects the lift valve, controllable by a handle 118 at the upper left of the structure 38, to the ram 78. The speed valve 105, supplied by the pump 106 via a line 119, to which the relief valve is connected, is connected by a line 120 to the lift valve 107.

The reversing valve 104 may be of any well-known solenoid-controlled type, being shown here as equipped with forward and reverse solenoids 121 and 122, the wiring for which is largely omitted in the interests of clarity. Suffice it to say that electrical energy, furnished by a pair of storage batteries 123, which also drive an electric motor 124 for the hydraulic pump 106, energizes the solenoids under the control of forward and reverse push buttons 125 and 126 on the control handle 91. A portion of the wiring from the buttons to the electrical circuit including the batteries, solenoids and electric motor is visible at 127 in FIG. 11.

The handle 91 also incorporates a speed control lever 128, pivoted to the handle at 129 and movable to control the speed valve 105 via a sheathed cable or wire 130 leading to a lever 131, spring loaded at 131', on the valve (FIGS. 7 and 11).

The particular details of the hydraulic and electrical circuits are not as significant in the present invention as is the means and design whereby the components other than the handle 91 and related parts are contained within the structure 38. Hence, any valves, motors, solenoids, etc. may be used, those shown here being representative of those known to give desirable performance in powering the carrier for forward, reverse, stop, variable speed in either direction, steerability, and raising and lowering of the fork means 39. Noteworthy is the mounting of the batteries 123 at either side of the centrally located steering shaft connection 97. These bateries may be carried on suitable supports or trays 132 on the cross members 75. The electric motor 124 and pump 106 are coaxially connected and are carried by the cross member 45, as is the speed valve 105. The several fluid lines are arranged so that they are either confined by the front and rear covers 98 and 101 or lie within the plane of those covers. The handle 91, when in steering position, is the only element projecting rearwardly of dimension F, and this handle can be folded to lie within this dimension as described above.

Considering the upright structure 38 to be delineated at opposite sides by its uprights 43 and as having front and rear portions represented here by the covers 98 and 101 (or the planes of the covers when the covers are removed), it will be seen that within this structure is a compartment or space within which the several components, best seen collectively in FIG. 7, are housed or contained. These are nested or otherwise arranged within this space in such manner as to keep dimension F to a minimum. In this regard, extensions of the covers in their respective planes also define this space.

The operation of the carrier has been previously described generally relative to its mobility and maneuverability within the van, to which description should be added the propulsion and the raise and lower features. Although the specific hydraulic system is not per se limiting, a brief description thereof may be in order.

When the carrier 37 is not in use, the electric motor is of course not energized. Since the pump is not driven, therefore, no fluid pressure is available. Power propulsion of the carrier is achieved by pressing the proper directional button 125 or 126 on the handle 91. This starts the electric motor and pump as well as shifting the forward-reverse valve 104 from its central position of FIG. 12. It will be assumed that the lift valve is in neutral and the speed valve in "stop" position (FIG. 12). Hence, fluid flow, although passing through the speed valve 105 and thence through the lift valve 107 and the shifted forward-reverse valve 104 to the wheel motor 102, does not pressurize the motor since the fluid flows to the reservoir via the T 113 and line 112. It is therefore necessary to use the speed control lever 128 to alter the status of the speed valve 105, as by shifting it to an intermediate ("slow") condition (105' in FIG. 12) wherein only part of the fluid flow goes through the neutrally positioned lift valve for return at 113–111 to reservoir and part goes to the shifted forward-reverse valve 104 and thence to the wheel motor 102. If the speed lever 128 is moved more to the rear, the speed valve shifts to position 105'' (fast) and all flow is via 116–104 to the wheel motor, The same thing holds true if the other directional button 125–126 is pressed, but the carrier of course travels in the opposite direction.

The foregoing will, say, bring the carrier to a position in which, it is ready to pick up a pallet, and the tines, lowered, are inserted beneath the pallet board 35 and between the skids 36 and forward travel of the carrier is stopped by allowing the speed lever to return to "stop," toward which condition it is suitably biased (spring 131'). When the speed valve 105 returns to its "stop" position (FIG. 12) it diverts fluid flow at 120 to the lift valve 107 and when the latter is shifted to its "raise" position— to the left as seen in FIG. 12—the line 120 is connected by the shifted valve 107 to the ram 78 via line 117, and the fork means raises and picks up the pallet. The lift valve is returned to neutral as shown in FIG. 12 and the carrier, with the pallet supported thereby, is driven away.

When the proper destination is reached for deposit of the pallet, the carrier is stopped as described above, and the fork means is lowered by shifting the lift valve to the right of its FIG. 12 position ("lower"), exhausting the ram 78 via 117, 107, 114, 113 and 112.

It might be observed here that the schematic illustration of the speed valve 105 in FIG. 12 shows at 105' a single restriction as representing restricted diversion of part of the fluid flow to reservoir via 105', 120, 107 (in neutral) 114, 113 and 112. In a commercially acceptable valve, there could be an infinite number of speed stages intermediate the "slow" and "fast" positions shown, and the difference would result from changing restrictions. However, this is all known to those versed in the art and as already pointed out is no specific part of the present invention. It is therefore deemed that the schematic illustration will suffice for present purposes.

Variations in other specific parts of the present disclosure will also readily occur to those skilled in the art, all without departure from the sprit and scope of the invention.

What is claimed is:

1. A cargo carrier of the class described, comprising a carrier frame having a rear upright structure and fork means secured to and extending forwardly from the lower end portion thereof, said structure comprising a pair of laterally spaced uprights and having front and rear portions relatively closely spaced apart; front wheel means supporting the forward portion of the tine means; a single steerable rear wheel means disposed centrally between the uprights of said structure and carried thereby and including upwardly extending steering shaft means also centrally between said uprights; a cross member spanning said uprights and including a central bearing carrying part of said shaft means; drive means for the rear wheel means; and power means connected to and for driving said wheel means and including a pair of electric storage batteries carried by the cross member respectively at opposite sides of the steering shaft means and within the confines of said uprights and the front and rear portions of said upright structure.

2. The invention defined in claim 1, including: a second cross member spanning said uprights and closely spaced above the batteries, and an electric motor included in said power means and carried by and on top of said second cross member and within the confines of said uprights and the front and rear portions of said upright structure.

3. The invention defined in claim 1, in which: said rear wheel means is connected to the steering shaft means by a yoke and said yoke carries the drive means for said rear wheel means.

4. The invention defined in claim 1, including: a control handle connected to the steering shaft means and movable between an operating position extending rearwardly beyond the rear portion of said upright structure and a storage position within the plane of said rear portion.

5. The invention defined in claim 1, in which: the carrier frame is mounted on the wheel means for relative raising and lowering; and means is connected between the wheel means and the frame for raising and lowering the latter and including a force-transmitting device offset fore-and-aft from the steering shaft means but disposed also centrally between said uprights and within the confines of said uprights and the front and rear portions of said upright structure.

6. For use with a load-handling system having an overhead traversing support and suspension means depending therefrom, a cargo carrier comprising a lower fore-and-aft ground-proximate element adapted to receive and carry a load thereon and having a free front end and a rear end, an upright element rigidly secured to and rising from the rear end of said lower element to an upper end portion, an elongated rigid arm rigidly secured to and extending forwardly from said upper end portion of the upright element to a free front end overhanging said lower element, said arm having a track means running lengthwise thereof, a trolley carried by and movable along the track means and having means for suspended attachment to said suspension means, front and rear stop means respectively at the front and rear ends of said arm for normally confining the trolley against escape from track means, one of said stop means being releasable to enable removal of the trolley from track means while retaining its connection to the suspension means, and wheel means carried by the lower element to support the carrier for rolling over the ground when the trolley is removed from the track means.

7. The invention defined in claim 6 in which the arm means inclines forwardly uphill and the releasable stop means is the rear stop means.

8. For use with a load-handling system having an overhead traversing support and suspension means depending therefrom, a cargo carrier comprising a lower fore-and-aft ground-proximate element adapted to receive and carry a load thereon and having a free front end and a rear end, an upright element rigidly secured to and rising from said rear end to an upper end portion, an elongated rigid arm rigidly secured to and extending forwardly from said upper end portion to a free front end overhanging said lower element, said arm having track means running lengthwise thereof, a trolley carried by and movable along the track means and having means for suspended attachment to the suspension means, front and rear stop means respectively at the front and rear ends of said arm for normally confining the trolley against escape from the track means, releasable means to enable removal of the trolley from the track means while retaining its connection to the suspension means, and wheel means carried by the lower element to support the carrier for rolling over the ground when the trolley is removed from the track means.

References Cited by the Examiner

UNITED STATES PATENTS

| 2,592,091 | 4/1952 | Weaver | 180—13 |
| 2,849,253 | 8/1958 | Bopp | 294—63 |
| 2,918,322 | 12/1959 | Bopp | 294—67 X |
| 2,944,689 | 7/1960 | Arnot | 214—620 |
| 3,066,968 | 12/1962 | Brooks | 294—67 X |
| 3,202,233 | 8/1965 | Dolphin et al. | 180—13 |

GERALD M. FORLENZA, *Primary Examiner.*

ALBERT J. MAKAY, *Examiner.*